April 10, 1934.  J. R. CAIN  1,954,664
ELECTROLYTIC PROCESS FOR THE REGENERATION OF PICKLE LIQUOR
Filed Oct. 24, 1932
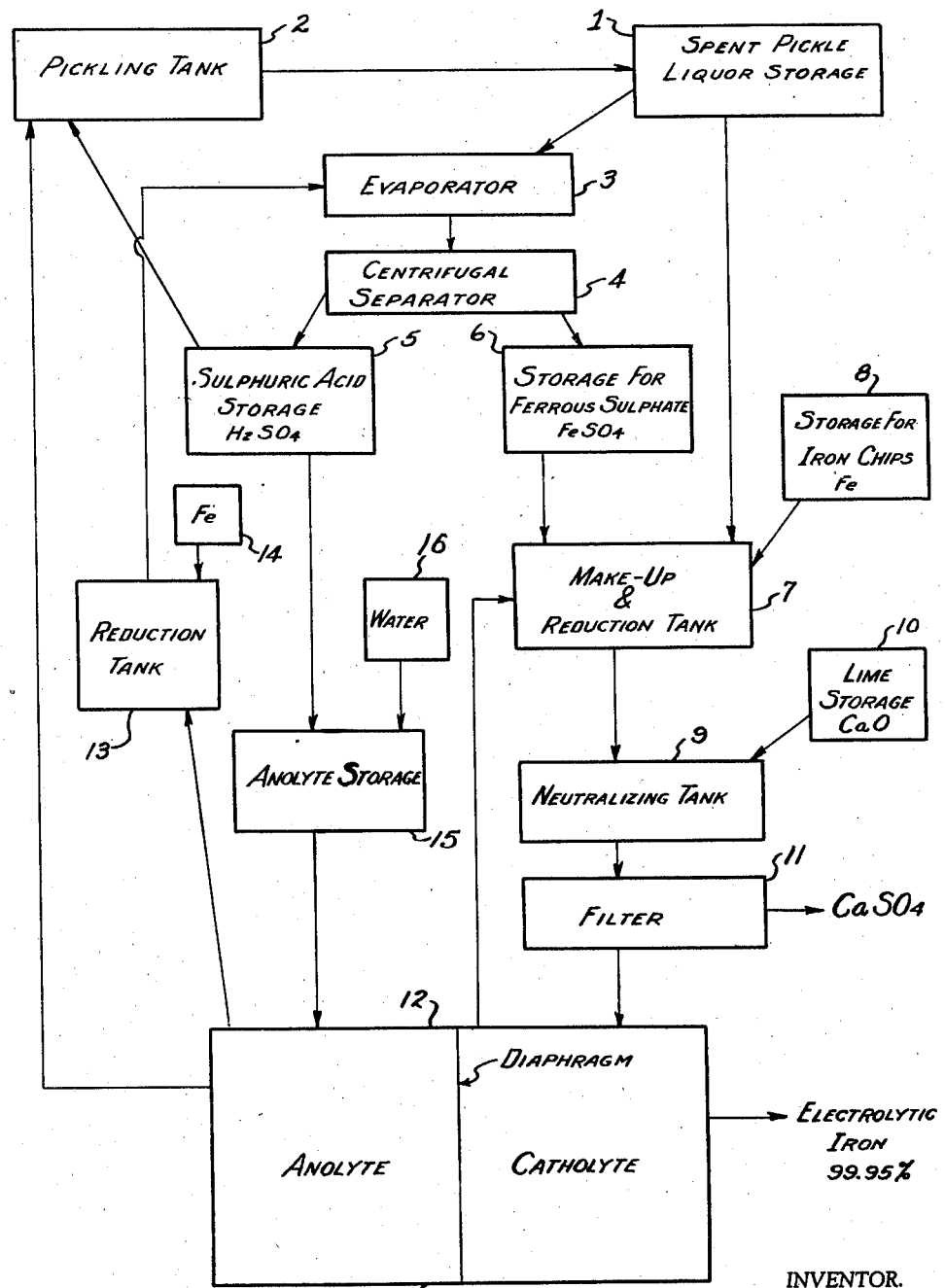
INVENTOR.
John R. Cain
BY Allen & Allen
ATTORNEYS.

Patented Apr. 10, 1934

1,954,664

UNITED STATES PATENT OFFICE 1,954,664

ELECTROLYTIC PROCESS FOR THE REGENERATION OF PICKLE LIQUOR

John R. Cain, Washington, D. C.

Application October 24, 1932, Serial No. 639,235

20 Claims. (Cl. 204—1)

My invention relates to electrolytic processes for the disposition of pickle liquors with the recovery of useful products, and more particularly it relates to the regeneration of pickling acid from spent pickle liquors together with the recovery of by-products of some value.

It will be understood that the production of large quantities of spent pickle liquors, which are a waste product, presents a very serious problem to the steel mill and plant wherein pickling is done. It is rapidly becoming impossible to discharge spent pickle liquors into sewers and streams; and even where this is done, it creates a serious nuisance. It has been the practice in some localities to neutralize these waste materials as by the use of lime preliminary to discharging them; and it is one of the objects of my invention to eliminate this source of inconvenience and expense. Another object of my invention is to provide a method and means for the cheap recovery of the free acid in the liquors prior to or concurrently with electrolytic steps for treating the contained iron salts, as will hereinafter be described.

Still other objects of my invention are to provide for the regeneration of acid from the metallic salts produced in the pickling operation together with a recovery in the metallic content of such salts, the acid being available for additional pickling steps, and the metal being recovered in useful form. Hence, an object of my invention is the regeneration of sulphuric acid from ferrous sulphate in pickle liquors as commonly produced. Further it is my object to reduce to a minimum the quantity of iron salts which must of necessity accompany the free acid in the regenerated product. Another object of my invention is to recover iron from the ferrous sulphate in the form of an exceedingly pure electro-deposit which may be utilized for various purposes.

In the commercial pickling of iron or steel with sulphuric acid, there is a good deal of variation in practice, and consequently considerable variation in the nature of the spent liquors which are to be treated in accordance with my invention. The process of pickling iron or steel is essentially one utilizing this reaction:

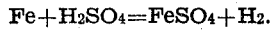

$$Fe + H_2SO_4 = FeSO_4 + H_2.$$

The reaction is so controlled that the generation of hydrogen primarily, reinforced to a secondary degree by a solvent action of the acid, breaks the bond between the metal and the scale or dirt, and lifts these foreign materials from the surface of the metal which is being pickled. The main objects to be attained in successful pickling are: (1) economical utilization of the acid, (2) minimum solvent action upon the metal being pickled, (3) a rapid cleaning action looking toward a large output of work, and (4) prevention of deposits on the metal after it is cleaned by pickling. These objects are attained in various degrees according to the skill and experience of the operator and the adequacy of the equipment. It will be clear, however, that the nature of the spent pickle liquor will vary within fairly wide limits.

Spent pickle liquors resulting from such variations in practice may be defined chemically as aqueous solutions mainly of ferrous sulphate, ranging roughly from one-fourth saturation to complete saturation at room temperature, and containing usually free sulphuric acid which may run up to 10% by weight, a common range of free acid being in the neighborhood of two to five per cent. Spent pickle liquors may also contain very much smaller amounts of ferric sulphate, manganous and cupric sulphates, and occasionally small amounts of nickel, arsenic, tin, and other metals.

While various ways of disposing of spent pickle liquors have been suggested, ranging from mere neutralization prior to disposal to processes involving the chemical conversion of substances in the pickle liquor, two different forms which have, or are supposed to have, commercial value as such. Thus, some proposals have contemplated a heat treatment of the solid contents of pickle liquors with or without previous chemical conversion, so as to produce materials of the general nature of pigments or the like. Again, proposals have been made looking toward the production of electrolytic iron in various forms and through the use of various types of electrolytes. These proposals are not suitable for the regeneration of pickle liquors, since the electrolytic product is the thing desired, and all other factors are subordinated to this end. In the process of my invention, the emphasis is on the economical regeneration of pickle liquor; and such other by-products as result therefrom go to increase the economy of the operation. Since this is the case, it will be understood also that the emphasis in my invention is on a process of cyclical character suitable for the continuous recovery or regeneration of spent pickle liquor. This introduces certain problems which it is a primary object of my invention to solve. It is my object to provide a process of cyclical character comprising a series of coordinated steps which must be employed in order to produce the desired continuous regeneration. I do not desire the statement just made, however, to be taken as limiting the range of equivalents as applied to any particular step or steps.

These objects and others which will be set forth hereinafter, or will be apparent to one skilled in the art upon reading the specifications, I accomplish by that certain series of process steps of which I shall now set forth a preferred embodiment. Reference may be made to the drawing which forms a part hereof, and which is a diagrammatic flow sheet of the series of operations hereinafter to be described, for a better understanding thereof.

In brief my invention contemplates a series of steps including the treatment of spent pickle liquor so as to recover large quantities of metallic salts therefrom, and at the same time to concentrate and prepare for subsequent use such free acid as the original spent liquor contained. The free acid may then be returned to the pickling operation with or without preliminary treatment, or it may be employed in whole or in part in such subsequent steps of my process as require the employment of acid. The salts consisting primarily of ferrous sulphate, are prepared in certain ways hereinafter to be described, for electrolysis, and then are electrolyzed for the removal of the metallic content thereof and the regeneration of acid. The metallic content is a by-product. Since the electrolysis of the metallic salts never goes to entire completion, the solution of regenerated acid will contain considerable quantities of metallic salts. Under some circumstances it may be used directly for pickling. Under other circumstances my cyclical process contemplates the treatment of the regenerated product to concentrate the acid therein and to remove therefrom such undesirable quantities of metallic salts as may be contained therein.

I have spoken of the possibilities of other metallic salts being found in spent liquor. In the regenerated acid made as hereinafter to be described, there may be a tendency, after a certain number of cycles of regeneration, for some of these substances to accumulate to such an extent as to interfere with subsequent treatments. Accumulations of such substances, including, by way of example, salts of manganese, copper, nickel, arsenic, and tin, may be removed from any of the solutions herein described by ways well known in the art which need not be described here. Or, by suitably conducting my process, it will be possible to discharge at intervals such portions of the liquid in any of the various stages as contain so great a percentage of these undesirable constituents as would interfere with further operations, without encountering the difficulties at present experienced with the discharge of great quantities of spent pickle liquors.

If alloy steels containing nickel, chromium, molybdenum, tungsten, vanadium, etc., in large quantities such as are found in many commercial types of steels, are pickled, the spent liquors may contain quantities of these elements or their salts, which would not render them amenable to my process. Where this is the case, it will be understood that such spent pickle liquors will first be treated for the removal of these elements or compounds in ways known to the art prior to the application of the particular steps comprised in the broadest aspect of my process.

In carrying out my process for regenerating pickle liquor, I subject it first to a step which separates most of the iron salts as crystals of copperas ($FeSO_4 \cdot 7H_2O$), and leaves a mother liquor enriched in free acid. This liquor may, under many circumstances, be reused for pickling, or may be employed after concentration or other treatment steps as hereinafter described. The initial separation of the iron salts may be accomplished in several ways. Where the liquor is saturated or nearly saturated at ordinary temperatures with the ferrous sulphate, a considerable degree of crystallization may take place if the liquor is refrigerated and in this way quantities of the iron salt may be removed. I prefer, however, to evaporate the solution with the attendant crystallization of the iron salt, since this not only removes the iron salt, but at the same time concentrates any free acid remaining in the original spent liquor. Where the spent liquor runs high in free acid, this evaporation step will frequently give a liquid product which may be returned to the pickling tanks. A liquor containing considerable quantities of free acid but diminished in iron salt content may, of course, be separately concentrated, if desired. The mother liquor may be separated from the crystals of iron salt in any way desired. I prefer to employ a centrifuge.

I then dissolve the separated crystals in water, and if the solution is not already sufficiently neutral for electrolysis, I make it so by adding suitable neutralizing agents. The neutralized solution of ferrous sulphate is placed in a diaphragm cell as a catholyte; and as the anolyte I may employ a less concentrated aqueous solution of the ferrous salt or a dilute sulphuric acid solution without iron salt, or with a minimum iron salt content. For the anolyte I may readily employ, with dilution, a portion of the mother liquor referred to above, in which the free acid content has been concentrated, and in which the iron salt content is relatively low. The anode employed is of the insoluble type, such as graphite or lead; and the cathode, usually of iron, may, however, be of some other suitable substances forming a support upon which iron may be plated out and from which it may subsequently be removed. Upon passing a suitable direct current through the electrolytic system, the ferrous sulphate solution is decomposed, so that iron is deposited on the cathode and sulphuric acid is formed at the anode. The reactions are, essentially:

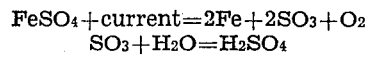

The ions of iron give up their charges at the cathode and are deposited as electrolytic iron and the $SO_3$ ions combine with water of the solvent and form sulphuric acid. The oxygen is partly given off as molecular oxygen and partly used in oxidizing any ferrous iron present in the anolyte:

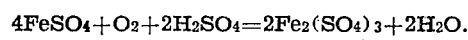

In practice I find that these electrolytic actions proceed for a while and then slow down or stop unless steps are taken to provide for their continuance. This slowing down or cessation of the reactions is due to the fact that where a diaphragm cell is used for this kind of electrolysis there is a flow of material each way through the walls of the diaphragm. The nature of the substances that migrate and their amounts are determined largely by the porosity of the diaphragm and its material and also to some extent by the specific characters of the substances in solution in the anolyte and catholyte. Without going into the details of these complex phenomena it can be said that they affect the reactions above given in two ways: 1. There is a tendency for the concentration of iron sulphates to increase in the anolyte; 2. There is a tendency for some sulphuric acid to diffuse to the catholyte. The latter action is the important one in the effect it has on slowing down or stopping the process, for I have found that when the concentration of free acid in the catholyte is considerably less than 0.5% free $H_2SO_4$, iron is deposited inefficiently at the cathode and hydrogen is then the main product formed there. When this stage is reached during electrolysis there is practically no $SO_3$ formed at the anode, but oxygen then becomes the main product there. Therefore, my process will not give commerically useful results in regenerating pickle liquor unless effective steps are continuously employed to prevent the concentration of free acid in the catholyte from becoming too high. I accomplish this result by a combination of these steps: 1. Maintaining the catholyte at a higher level than the anolyte so that liquid is forced to flow toward the anolyte; 2. Not allowing the free acid content of the anolyte to become too great; 3. Adding continuously or periodically to the catholyte suitable neutralizing agents as needed. For such neutralization I have used iron or steel chips or borings, lime or ferrous sulphide. If these precautions are taken electrolytic decomposition does not slow down but may be carried on indefinitely with good yields of iron and acid until nearly all the ferrous sulphate has disappeared from the electrolyte.

In practice I have combined all these steps so as to give a continuous process as described later so that as ferrous sulphate is decomposed into sulphuric acid and electrolytic iron more ferrous sulphate crystals are added to the system in amounts proportioned to the amounts decomposed.

It will be understood that the electrolytic action may be made continuous with a proper control of the several factors, and also that the circulation of the catholyte and anolyte may be made continuous through the two divisions of the electrolytic cell. The solutions may also be recirculated where desired, through the cell, with or without intermediate filtration, portions being taken away and portions being added as may be found desirable.

My continuous process for the electrolytic regeneration of pickle liquor is illustrated in the drawing, in which the portions shown on the flow sheet are as follows: Spent liquor from the pickling tank 2 is accumulated in a storage tank 1 for spent liquor. Thence, as required it is drawn off into a suitable device for the removal of portions of the iron salt. Such apparatus may comprise a vacuum steam evaporator 3 or other suitable device. The liquid is there concentrated so that the crystals of copperas are deposited in the usual crystallizing apparatus, and the mother liquor may be separated therefrom in a centrifugal separator 4. It will, of course, be enriched in sulphuric acid where there was free acid in the original spent liquor, which will be true in substantially all cases. When the sulphuric acid concentration is sufficiently high (say 70 to 80% $H_2SO_4$) this portion of the regenerated acid may be transferred to a concentrated sulphuric acid reservoir 5, from which portions may be withdrawn as needed to make up fresh supplies of pickling acid to be stored or used in the pickling tank 2. The ferrous sulphate crystals separated by the centrifugal separator 4 go to a storage hopper 6 for ferrous sulphate, from which increments are transferred to a make up and reduction tank 7, where they are either dissolved in water to make up a catholyte, or are dissolved in impoverished catholyte from the electrolytic cell 12. It is advisable at this point to treat the solution so as to reduce any ferric sulphate contained therein. An easy way to do this is by the treatment of the solution in the make up and reduction tank with iron or steel chips, turnings, filings, or the like, together with a small quantity of spent pickle liquor from the storage tank 1. The free acid in the spent pickle liquor attacks the iron chips, and the nascent hydrogen liberated by this reaction will effectively reduce any ferric sulphate present to the ferrous form.

The reduced ferrous sulphate solution is then transferred to a neutralizing tank 9 where any free acid therein may be neutralized either by an additional treatment with iron or by the addition of lime from a hopper 10. It is well at this point to filter the neutralized ferrous sulphate solution, and I have indicated a filter at 11 in which foreign materials, together with any metallic iron particles carried over from the neutralizing tank, and calcium sulphate formed by the neutralizing step (if lime is employed), will be removed. After filtering, the solution is introduced into the cathode portion of the electrolytic cell 12, where it forms the catholyte. The cell, as hereinabove noted, contains an insoluble anode and a suitable cathode separated by a porous diaphragm of proper characteristics. Diaphragms of asbestos will be found suitable, but other types of porous diaphragms may also be employed. The diaphragm ought, of course, to resist the action of the anolyte and catholyte, and should not be too porous, for reasons which have been made clear.

The anolyte of the cell may be supplied from an anolyte storage tank 15 replenished either from the concentrated acid tank 5 or from a portion of material from the make up and reduction tank 7 diluted with water from a source 16. The anolyte will contain ferrous sulphate and sulphuric acid in quantities determined by the particular conditions of operation chosen, the quantities being controlled by the ferrous sulphate concentration maintained in the neutralizing tank 9 and the degree of dilution of the acid in the tank 15.

A difference in level between the anolyte and the catholyte is maintained continuously, and the head is chosen to give the result desired. In general, the difference of level will vary somewhat with each set of diaphragms and with each given set of operating conditions, such as the concentration of the anolyte and catholyte, the current density, the temperature and the like, and must be experimentally determined in accordance with these conditions.

When suitable current is passed through the cell 12, the acid content of the anolyte increases and the iron salt content of the catholyte decreases proportionately to the ampere hours consumed. Theoretically 1.04 grams of iron will be deposited upon the cathode, and an amount of sulphuric acid chemically equivalent to the bivalent iron will be formed in the anode chamber for each ampere hour. The actual recoveries have been found to vary between 75 to 80% for each.

The catholyte is maintained at the desired strength by continuous or periodic replenishment with iron salt and by neutralization, filtration, etc., it being convenient to return the spent catholyte to the make up and reduction tank 7, sending it additionally through 9 and 11 before it is returned to the cathode compartment.

The anolyte containing the regenerated acid flows at the proper rate to a reduction tank, where it may be treated with iron or steel chips, scraps, filings, or the like, from a hopper 14. The purpose of this compartment, of course, is to reduce any ferric sulphate formed therein. Under some circumstances the acid may be returned to the pickling tank 2, but it will more usually be found necessary to send it back to the evaporator 3, where it is concentrated, and then through the centrifugal separator 4, where the concentrated acid will be separated from the metal salts and transferred to the storage tank 5. As needed for pickling purposes, quantities of acid are withdrawn from this tank as desired.

In the reduction tank 13 the ferric sulphate formed in the anode section of electrolytic tank 12 by action of oxygen on the ferrous sulphate, as mentioned above, is reduced again to ferrous iron, thus:

$$Fe_2(SO_4)_3 + H_2SO_4 + H_2 = 2FeSO_4 + 2H_2SO_4$$

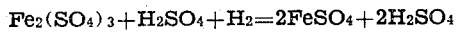

The ferrous sulphate-sulphuric acid solution thus formed undergoes the changes already described in passing through 3 and 4, so that the process is also cyclic for the anolyte. If desired, a portion of the anolyte may go directly to certain pickling operations, such as bar pickling or others, where a small content of ferric iron is not a disadvantage. The action of the hydrogen liberated during pickling quickly reduces such small amounts of ferric to ferrous iron.

It will be understood, of course, that all necessary pumps or other devices for securing the continuous circulation of liquids and electrolytes herein described are provided, although not shown in the flow sheet.

A desirable strength of catholyte is about three-fourths saturated with ferrous sulphate at room temperature. This gives an electrolyte with good conductivity and hence the working voltage of the cell is lowered. The voltage is also governed by the spacing of electrodes, the current density, the temperature of the electrolyte and especially by the porosity of the diaphragm. A desirable operating temperature range is 80 to 90° C. and a convenient current density is 40 amperes per square foot of cathode surface. It promotes efficiency of recovery, also, if the acid concentration in the anode compartment does not exceed 20% free $H_2SO_4$ at any time. However, I do not wish to limit myself to such concentrations as mentioned for anolyte and catholyte, for they may be different if found advantageous. For instance, if a higher acid concentration in the anolyte is wanted it is desirable to increase the inflow of liquid to the anolyte by increasing the hydrostatic head or using a more porous diaphragm; this in turn increases the amount of salts to be handled in 13, 3 and 4. The best manner of operation in a given case must therefore be based upon the several factors herein mentioned and has to be chosen in a way to meet any special conditions found.

I have found that although my invention gives the results described when working with sulphate pickle liquor it operates differently with ferrous chloride pickle liquor resulting from the use of hydrochloric acid for pickling iron and steel. The reason for this is that the anodic reaction when ferrous chloride is electrolyzed results in the formation of ferric chloride, chlorine and possibly a little oxygen, but no hydrochloric acid. Hence, ferrous chloride pickle liquors when electrolyzed do not regenerate the acid that was consumed in pickling. Thus, as applied to spent pickle liquor from hydrochloric acid pickling operations, the various steps hereinabove described do not result in a regeneration of the acid; but they may be employed as a means for disposing of spent hydrochloric acid pickle liquor with a recovery of the various by-products just mentioned. Obviously, however, my process finds its primary usefulness in the treating of spent pickle liquors from sulphuric acid pickling operations.

The electrolytic iron made by my process is of high purity and is suitable for melting stock to make very pure iron or alloys of iron.

Having thus described my invention, what I claim as new and desire to secure by Letters Patent, is:—

1. A process of regenerating spent pickle liquor which comprises separating from said liquor a quantity of metallic salts therein contained, dissolving said salts to form an electrolyte thereof, reducing said electrolyte to eliminate ferric salts therein, controlling the acidity of said electrolyte, and electrolyzing said electrolyte in a diaphragm electrolytic cell with the recovery of metal and regeneration of acid, afterward treating said acid to fit it for additional pickling operations.

2. A process for regenerating spent sulphuric acid pickle liquor containing free sulphuric acid, which comprises separating from said liquor a substantial proportion of the metallic salts contained therein and concentrating the acid in the remainder, forming an electrolyte from said separated metallic salts, reducing said salts to the ferrous form, neutralizing said electrolyte and electrolyzing it as a catholyte in a diaphragm electrolytic cell whereby metal is recovered, and maintaining the strength of said electrolyte by further additions of said metallic salts.

3. A process for regenerating spent sulphuric acid pickle liquor containing free sulphuric acid, which comprises separating from said liquor a substantial proportion of the metallic salts contained therein and concentrating the acid in the remainder, forming an electrolyte from said separated metallic salts, reducing said salts to the ferrous form, neutralizing said electrolyte and electrolyzing it as a catholyte in a diaphragm electrolytic cell whereby metal is recovered, and maintaining the strength of said electrolyte by further additions of said metallic salts, employing as an anolyte a portion of recovered acid solution and regenerating additional acid therein, afterward treating said anolyte to fit it for further pickling operations.

4. A process for regenerating spent sulphuric acid pickle liquor containing free sulphuric acid, which comprises separating from said liquor a substantial proportion of the metallic salts contained therein and concentrating the acid in the remainder, forming an electrolyte from said separated metallic salts, reducing said salts to the ferrous form, neutralizing said electrolyte and electrolyzing it as a catholyte in a diaphragm electrolytic cell whereby metal is recovered, and maintaining the strength of said electrolyte by further additions of said metallic salts, employing as an anolyte a portion of recovered acid solution and regenerating additional acid therein, afterward treating said anolyte to fit it for further pickling operations, all of said operations being continuous.

5. A process for regenerating spent sulphuric acid pickle liquor containing free sulphuric acid, which comprises separating from said liquor a substantial proportion of the metallic salts contained therein and concentrating the acid in the remainder, forming an electrolyte from said separated metallic salts, reducing said salts to the ferrous form, neutralizing said electrolyte and electrolyzing it as a catholyte in a diaphragm electrolytic cell whereby metal is recovered, and maintaining the strength of said electrolyte by further additions of said metallic salts, employing as an anolyte a more dilute solution of said metallic salts and regenerating acid therein, afterward treating said anolyte to fit it for further pickling operations by concentrating the acid therein and removing therefrom a substantial portion of contained metallic salts.

6. A process for regenerating spent sulphuric acid pickle liquor containing free sulphuric acid, which comprises separating from said liquor a substantial proportion of the metallic salts contained therein and concentrating the acid in the remainder, forming an electrolyte from said separated metallic salts, reducing said salts to the ferrous form, neutralizing said electrolyte and electrolyzing it as a catholyte in a diaphragm electrolytic cell whereby metal is recovered, and maintaining the strength of said electrolyte by further additions of said metallic salts, employing as an anolyte a more dilute solution of said metallic salts and regenerating acid therein, afterward treating said anolyte to fit it for further pickling operations by concentrating the acid therein and removing therefrom a substantial portion of contained metallic salts, and reducing said anolyte prior to said separation step.

7. A process of regenerating spent sulphuric acid pickle liquor which comprises evaporating said liquor and separating the evaporated product to produce a liquor containing a more concentrated acid and crystals of metallic salts, dissolving said metallic salts to form a catholyte, reducing, neutralizing and filtering said catholyte, electrolyzing said catholyte in the cathode compartment of a diaphragm electrolytic cell, providing an anolyte, and maintaining a difference in level between said catholyte and anolyte to prevent undue diffusion of said anolyte into said catholyte through the diaphragm of said cell.

8. A process of regenerating spent sulphuric acid pickle liquor which comprises evaporating said liquor and separating the evaporated product to produce a liquor containing a more concentrated acid and crystals of metallic salts, dissolving said metallic salts to form a catholyte, reducing, neutralizing and filtering said catholyte, electrolyzing said catholyte in the cathode compartment of a diaphragm electrolytic cell, providing an anolyte, and maintaining a difference in level between said catholyte and anolyte to prevent undue diffusion of said anolyte into said catholyte through the diaphragm of said cell, afterward reducing said anolyte and returning said anolyte to said evaporator.

9. A process of regenerating spent sulphuric acid pickle liquor which comprises evaporating said liquor and separating the evaporated product to produce a liquor containing a more concentrated acid and crystals of metallic salts, dissolving said metallic salts to form a catholyte, reducing, neutralizing and filtering said catholyte, electrolyzing said catholyte in the cathode compartment of a diaphragm electrolytic cell, providing an anolyte, and maintaining a difference in level between said catholyte and anolyte to prevent undue diffusion of said anolyte into said catholyte through the diaphragm of said cell, afterward reducing said anolyte and returning said anolyte to said evaporator, retaining the acid produced by said separation step, and employing a portion, at least, of said acid for further pickling operations.

10. A process of regenerating spent sulphuric acid pickle liquor which comprises evaporating said liquor and separating the evaporated product to produce a liquor containing a more concentrated acid and crystals of metallic salts, dissolving said metallic salts to form a catholyte, reducing, neutralizing and filtering said catholyte, electrolyzing said catholyte in the cathode compartment of a diaphragm electrolytic cell, providing an anolyte, and maintaining a difference in level between said catholyte and anolyte to prevent undue diffusion of said anolyte into said catholyte through the diaphragm of said cell, afterward reducing said anolyte and returning said anolyte to said evaporator, retaining the acid produced by said separation step, and employing a portion, at least, of said acid for further pickling operations, and employing another portion of said acid in diluted form as said anolyte.

11. A cyclical process for the regeneration of spent pickle liquors which comprises crystallizing out of said liquors a substantial proportion of the metallic salts therein contained, separating said salts from the remainder of the liquor, dissolving the said salts to form an electrolyte, treating said electrolyte with iron to reduce the same, neutralizing said electrolyte, and electrolyzing said electrolyte with the production of iron and the regeneration of acid, and concentrating the acid resulting from said electrolytic step for reuse as a pickle.

12. A cyclical process for the regeneration of spent pickle liquors which comprises crystallizing out of said liquors a substantial proportion of the metallic salts therein contained, separating said salts from the remainder of the liquor, dissolving the said salts to form an electrolyte, treating said electrolyte with iron to reduce the same, neutralizing said electrolyte, and electrolyzing said electrolyte with the production of iron and the regeneration of acid, concentrating the acid resulting from said electrolytic step for reuse as a pickle, and removing a further quantity of metallic salts from said material prior to reuse as a pickle.

13. A process for the regeneration of spent sulphuric acid pickle liquor which comprises evaporating said liquor and separating said liquor into two components, one a mother liquor containing quantities of free sulphuric acid, and the other a crystallized substance consisting mainly of ferrous sulphate, retaining said mother liquor for reuse as a pickle, dissolving said salts, reducing and neutralizing said salts, and employing said salts as a catholyte in an electrolytic cell of the diaphragm type, withdrawing a portion of said mother liquor and diluting it to form an anolyte, electrolyzing said materials in said cell, and further treating said electrolyzed anolyte to reduce the same and concentrate the acid therein, afterward mixing said concentrated acid with said quantity of retained acid.

14. A process for the regeneration of spent sulphuric acid pickle liquor which comprises evaporating said liquor and separating said liquor into two components, one a mother liquor containing quantities of free sulphuric acid, and the other a crystallized substance consisting mainly of ferrous sulphate, retaining said mother liquor for reuse as a pickle, dissolving said salts, reducing and neutralizing said salts, and employing said salts as a catholyte in an electrolytic cell of the diaphragm type, withdrawing a portion of said mother liquor and diluting it to form an anolyte, electrolyzing said materials in said cell, and further treating said electrolyzed anolyte to reduce the same and concentrate the acid therein, afterward mixing said concentrated acid with said quantity of retained acid, replenishing the iron salt content of said catholyte by the addition of further salt accompanied by reduction and neutralization, and returning said replenished catholyte to the cathode compartment of said cell.

15. A process for the regeneration of spent sulphuric acid pickle liquor which comprises evaporating said liquor and separating said liquor into two components, one a mother liquor containing quantities of free sulphuric acid, and the other a crystallized substance consisting mainly of ferrous sulphate, retaining said mother liquor for reuse as a pickle, dissolving said salts, reducing and neutralizing said salts, and employing said salts as a catholyte in an electrolytic cell of the diaphragm type, withdrawing a portion of said mother liquor and diluting it to form an anolyte, electrolyzing said materials in said cell, and further treating said electrolyzed anolyte to reduce the same and concentrate the acid therein, afterward mixing said concentrated acid with said quantity of retained acid, replenishing the iron salt content of said catholyte by the addition of further salt accompanied by reduction and neutralization, and returning said replenished catholyte to the cathode compartment of said cell, all of said operations being continuous and cyclical, and including the step of returning a quantity of said retained acid solution to a pickling operation for reuse.

16. A process for the regeneration of spent sulphuric acid pickle liquor which comprises evaporating said liquor and separating said liquor into two components, one a mother liquor containing quantities of free sulphuric acid, and the other a crystallized substance consisting mainly of ferrous sulphate, retaining said mother liquor for reuse as a pickle, dissolving said salts, reducing and neutralizing said salts, and employing said salts as a catholyte in an electrolytic cell of the diaphragm type, withdrawing a portion of said mother liquor and diluting it to form an anolyte, electrolyzing said materials in said cell, and further treating said electrolyzed anolyte to reduce the same and concentrate the acid therein, afterward mixing said concentrated acid with said quantity of retained acid, replenishing the iron salt content of said catholyte by the addition of further salt accompanied by reduction and neutralization, and returning said replenished catholyte to the cathode compartment of said cell, all of said operations being continuous and cyclical, and including the step of returning a quantity of said retained acid solution to a pickling operation for reuse, and maintaining in said cell a difference in head between said anolyte and said catholyte to inhibit the diffusion of said anolyte into said catholyte.

17. A process for the regeneration of spent sulphuric acid pickle liquor which comprises evaporating said liquor and separating said liquor into two components, one a mother liquor containing quantities of free sulphuric acid, and the other a crystallized substance consisting mainly of ferrous sulphate, retaining said mother liquor for reuse as a pickle, dissolving said salts, reducing and neutralizing said salts, and employing said salts as a catholyte in an electrolytic cell of the diaphragm type, withdrawing a portion of said mother liquor and diluting it to form an anolyte, electrolyzing said materials in said cell, and further treating said electrolyzed anolyte to reduce the same and concentrate the acid therein, afterward mixing said concentrated acid with said quantity of retained acid, replenishing the iron salt content of said catholyte by the addition of further salt accompanied by reduction and neutralization, and returning said replenished catholyte to the cathode compartment of said cell, all of said operations being continuous and cyclical, and including the step of returning a quantity of said retained acid solution to a pickling operation for reuse, maintaining in said cell a difference in head between said anolyte and said catholyte to inhibit the diffusion of said anolyte into said catholyte, and continuously circulating said anolyte and said catholyte.

18. A process for the regeneration of spent sulphuric acid pickle liquor which comprises evaporating said liquor and separating said liquor into two components, one a mother liquor containing quantities of free sulphuric acid, and the other a crystallized substance consisting mainly of ferrous sulphate, retaining said mother liquor for reuse as a pickle, dissolving said salts, reducing and neutralizing said salts, and employing said salts as a catholyte in an electrolytic cell of the diaphragm type, withdrawing a portion of said mother liquor and diluting it to form an anolyte, electrolyzing said materials in said cell, and further treating said electrolyzed anolyte to reduce the same and concentrate the acid therein, afterward mixing said concentrated acid with said quantity of retained acid, replenishing the iron salt content of said catholyte by the addition of further salt accompanied by reduction and neutralization, and returning said replenished catholyte to the cathode compartment of said cell, all of said operations being continuous and cyclical, and including the step of returning a quantity of said retained acid solution to a pickling operation for reuse, maintaining in said cell a difference in head between said anolyte and said catholyte to inhibit the diffusion of said anolyte into said catholyte, and continuously circulating said anolyte and said catholyte, employing as an anode an insoluble electrically conducting substance and as a cathode an electrically conducting substance forming a suitable support for the deposition of electrolytic iron.

19. A process of regenerating spent sulphuric acid pickle liquors which comprises providing an evaporator and a centrifugal separator and treating the spent pickle liquor therein to separate it into two components, one a crystallized salt comprising mainly ferrous sulphate, and the other a concentrated solution containing some metallic salt and a quantity of free acid, afterward cyclically treating said last mentioned component by returning a portion thereof to a pickling operation and by diluting a portion thereof to form an anolyte in an electrolytic cell of the diaphragm type, and cyclically treating said first mentioned component by dissolving it in water to make a catholyte, reducing it with iron, neutralizing it, filtering it, and employing it as a catholyte in an electrolytic cell, electrolyzing said catholyte and said anolyte and cyclically treating said catholyte by further additions of metallic salt, reduction and neutralization, also cyclically treating said anolyte by reduction and concentration and using a portion thereof in said pickling operation.

20. A process for regenerating spent sulphuric acid pickle liquor containing free sulphuric acid, which comprises separating from said liquor a substantial proportion of the metallic salts contained therein and concentrating the acid in the remainder, forming an electrolyte from said separated metallic salts, reducing said salts to the ferrous form, neutralizing said electrolyte and electrolyzing it as a catholyte in a diaphragm electrolytic cell whereby metal is recovered, and maintaining the strength of said electrolyte by further additions of said metallic salts, while keeping down the acidity of said catholyte by periodic neutralization.

JOHN R. CAIN.